(12) United States Patent
Visitsak et al.

(10) Patent No.: US 10,215,354 B2
(45) Date of Patent: Feb. 26, 2019

(54) SOLAR SHADING PANEL FOR NORTH AND SOUTH SIDES

(71) Applicants: Sopa Visitsak, Maeungnonthaburi, Nonthaburi (TH); Nattaree Sridaranon, Ladproa, Bangkok (TH)

(72) Inventors: Sopa Visitsak, Nonthaburi (TH); Nattaree Sridaranon, Bangkok (TH)

( * ) Notice: Subject to any disclaimer, the term of this patent is extended or adjusted under 35 U.S.C. 154(b) by 79 days.

(21) Appl. No.: 15/531,381

(22) PCT Filed: Nov. 27, 2015

(86) PCT No.: PCT/TH2015/000086
§ 371 (c)(1),
(2) Date: May 26, 2017

(87) PCT Pub. No.: WO2016/085418
PCT Pub. Date: Jun. 2, 2016

(65) Prior Publication Data
US 2018/0299088 A1    Oct. 18, 2018

(30) Foreign Application Priority Data
Nov. 28, 2014 (TH) .............................. 14010007156

(51) Int. Cl.
*F21S 11/00* (2006.01)
*E06B 9/24* (2006.01)
(Continued)

(52) U.S. Cl.
CPC .............. *F21S 11/007* (2013.01); *E06B 9/24* (2013.01); *E04D 13/033* (2013.01);
(Continued)

(58) Field of Classification Search
CPC ....................................................... F21S 11/00
(Continued)

(56) References Cited

U.S. PATENT DOCUMENTS 3,113,356 A * 12/1963 Piper ..................... E06B 7/082
52/473
2005/0213233 A1 * 9/2005 Bezzel ..................... E06B 9/24
359/893

(Continued)

FOREIGN PATENT DOCUMENTS

| DE | 10301929 | * | 7/2004 | ............... E06B 9/36 |
| JP | 60188558 A | | 9/1985 | |
| JP | 2014126713 A | | 7/2014 | |

OTHER PUBLICATIONS

International Search Report for PCT/TH2015/000066 dated May 17, 2016.
(Continued)

*Primary Examiner* — Clayton E Laballe
*Assistant Examiner* — Kevin Butler
(74) *Attorney, Agent, or Firm* — Thomas | Horstemeyer, LLP

(57) ABSTRACT

A solar shading panel for use in north and south sides of a building is described, where the solar shading panel is effective in preventing against direct sunlight partially or throughout the year without angle adjusting equipment, while allowing building occupants to perceive external views at all times. The solar shading panel includes a frame and an opaque panel with spacing perforates attached to hollow cylinders. An upper portion of the hollow cylinders can be configured to protect against direct light and a lower portion of the hollow cylinders can be configured to receive and reflect natural light into the building.

10 Claims, 4 Drawing Sheets

(51) Int. Cl.
 *F21S 19/00* (2006.01)
 *E04D 13/03* (2006.01)

(52) U.S. Cl.
 CPC ............... *E04D 2013/0345* (2013.01); *E06B 2009/2405* (2013.01); *E06B 2009/2417* (2013.01); *F21S 11/00* (2013.01); *F21S 19/00* (2013.01); *Y02B 10/20* (2013.01)

(58) Field of Classification Search
 USPC ........................................................ 359/597
 See application file for complete search history.

(56) References Cited

U.S. PATENT DOCUMENTS

| | | | | |
|---|---|---|---|---|
| 2007/0230209 | A1* | 10/2007 | Martin | E04C 2/322 362/576 |
| 2010/0212657 | A1* | 8/2010 | Moller | F24S 80/70 126/623 |
| 2011/0088754 | A1* | 4/2011 | Krause | A01G 9/1438 136/246 |

OTHER PUBLICATIONS

Machine Translation of JP60188558A, publication date Sep. 26, 1985.

* cited by examiner

SOLAR SHADING PANEL FOR NORTH AND SOUTH SIDES

CROSS-REFERENCE TO RELATED APPLICATIONS

This application is the 35 U.S.C. § 371 national stage application of PCT Application No. PCT/TH2015/000086 entitled "SOLAR SHADING PANEL FOR NORTH AND SOUTH SIDES," filed Nov. 27, 2015, where the PCT claims priority to and the benefit of Thailand (TH) Patent Application No. 14010007156, filed Nov. 28, 2014, both of which are herein incorporated by reference in their entireties.

TECHNICAL FIELD

The present invention relates to fields of engineering and architecture in connection with shading for buildings.

BACKGROUND OF THE INVENTION

Buildings are designed for daylight utilization by bringing in natural light from a side of a building without having direct radiation protection, where direct radiation has high energy causing many problems, such as glares and ultraviolet radiation (UV). UV radiation is known to be harmful to the eyes and health. The heat from direct rays affects human thermal comfort, cooling loads, and power consumption of air conditioning systems. In addition, ultraviolet (UV) rays from direct sunlight accelerate the deterioration process of human skin, interior finishing materials, and furniture.

Using shading to prevent direct radiation may be accomplished by various techniques, such as the use of various materials in various forms. Many of the shadings used in the past and present consist of long and flat panels, which include horizontal panels, vertical panels, or egg-crates (mixed horizontal and vertical panels) with both kinds of deadlocks and an adjustable angle. This may include the use of opaque or transparent materials to block the direct sunlight and perforate in various ways to obtain some light and provide outside views.

Horizontal shading panels include a sun shading device of European Patent Application No. EP20090151751, filed Jan. 30, 2009, the horizontal sun-shading device with adjustable louvers of Chinese Patent Application No. CN201433527 Y, published Mar. 31, 2010, and the solar window shade of U.S. Pat. No. 8,528,621 B2, published Sep. 10, 2013.

Vertical shading panels include the window blind of U.S. Pat. No. 2,882,563 A, published Apr. 21, 1959, and the split vertical window blind of U.S. Pat. No. 8,746,319 B1, published Jun. 10, 2014.

Vertical and horizontal shading screens and other solar screen panels include the self-regulating solar window device of U.S. Pat. No. 4,279,240 A, published Jul. 21, 1981, flat sheet panels, such as the variable screening U.S. Patent Publication No. 2012/0061029 A1, published Mar. 15, 2012, now issued as U.S. Pat. No. 8,960,259, and the curtain system of U.S. Patent Publication No. 2013/0139976 A1, published Jun. 6, 2013, now issued as U.S. Pat. No. 8,979,418.

Solar shading currently has several drawbacks. In general, the deadlock shadings are unable to prevent direct light throughout the year. In order to prevent direct light at all times, the panels or materials must be overlapped, which is wasteful and obscures external views. Sunscreen panels need to be angled in a direction to protect direct sunlight and are not easy to use. The use of electronics equipment to adjust shading devices angles are costly in terms of investment and maintenance, and may cause problems in the long term.

The sunscreen opaque panels, which have holes or are perforated evenly, allow building users to perceive an external view, but they are still not efficient or capable of protecting against direct sunlight year round. Increasing the thickness of the sheet or having shadings together with the voids may be better for sun protection, but are still inefficient due to materials being overlapped more than necessary.

BRIEF SUMMARY OF THE INVENTION

This invention relates to a solar screen or a shading panel, which consists of a frame and an opaque panel having spacing perforates attached to hollow cylinders to obtain natural light and provide exterior views. The upper part of each cylinder protects against direct sunlight and the lower part of the cylinder receives and reflects indirect sunlight into an interior space. The proportion of the extended part or the depth of the cylinder and the tilt angle vary in relation to the cylinder's diameter and the latitude of the installation site.

The aim of the invention of the solar shading panel for north and south sides is to provide a fixed sunscreen panel for use on north and south walls, openings, doors, and windows, in order to obtain natural light and to prevent direct light from the sun, all without the need of mechanical devices to adjust the angle for sun shading. The shape and form of the shadings and openings are designed to follow their functions, use less material (optimization design), provide an economical price, be easy to use and clean, and require low maintenance, all while being effective at preventing direct light from entering into a building. This helps to create a good internal environment for both temperature and lighting. The solar shading panel can reduce heat, glare, and ultraviolet radiation from direct light, which is harmful to eyes and skin. The sunlight that is allowed to enter into a building is indirect light, which light is good quality while improving comfort conditions for building occupants. In addition, the solar shading panel will help to reduce energy consumption for lighting and air conditioning systems. The solar shading panel also helps to maintain building materials and furniture, which may not wear out faster. The solar shading panel also allows building occupants to look outside throughout the day. The solar shading panel can be produced using various materials and can be applied in different forms and sizes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a solar shading panel for use on north or south sides of a building. The design concept is to develop a shading cylinder unit and then assemble several units, by attaching the units to an opaque panel with spacing perforates and a frame, to provide a panel that can be used as a part of a wall, an opening, a door, a window, or could be implemented in other parts of the building. The cylinder units have a form designed to perform functions, which include a combination of receiving indirect light and protecting against direct light from the sun. A proportion of a diameter, a width, and a tilt angle of the cylinders are determined from calculations, which correspond to a position of the sun on a critical design day that varies with the latitude of the location. The front panel is used for the north side, while the rear of the panel is used for the south side. An installation of the solar shading panel can be fixed and prevent against direct sunlight at all times without the use of mechanical devices.

The critical dates, which are used to calculate and design the solar shading panel to protect against direct sunlight from the north side, are June 21-22 for the northern hemisphere and December 21-22 for the southern hemisphere.

The critical dates, which are used to calculate and design the solar shading panel to protect against direct sunlight from the south side, are December 21-22 for the northern hemisphere and June 21-22 for the southern hemisphere.

Figure 1:
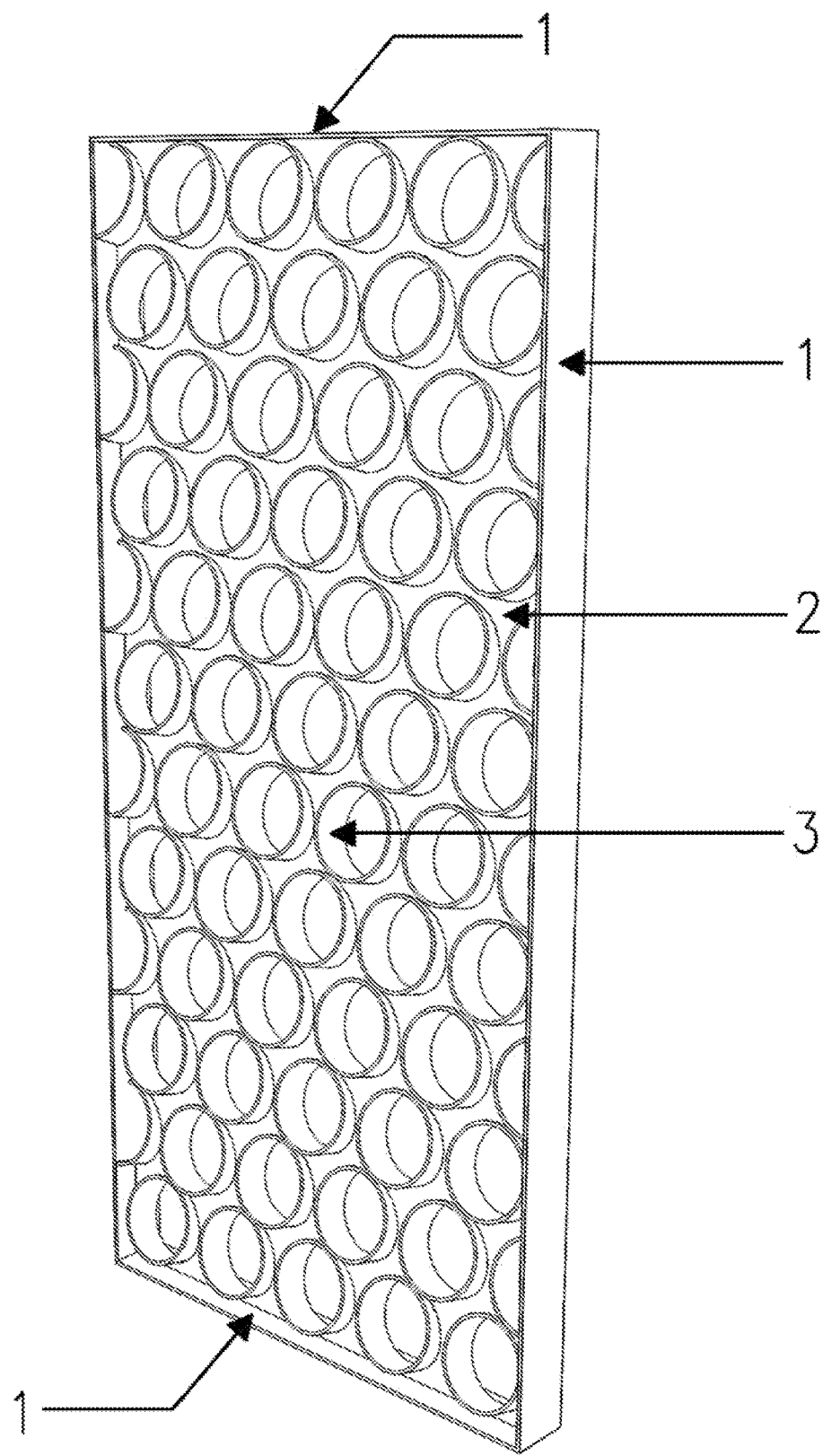
FIG. 1 shows a front view of the solar shading panel.

FIG. 1 shows a front view of the solar shading panel, which is used for the north side for the northern hemisphere and for the south side for the southern hemisphere. The solar panel for north and south sides consists of a frame (1) and an opaque panel (2) having a plurality of spacing perforates attached to a plurality of hollow cylinders (3) in order to obtain natural light and allow building occupants to perceive an external view of the building. The upper part of each of the cylinders (3) is for protecting against direct light partially or throughout the year and the lower part of each of the cylinders (3) is for receiving and reflecting natural light into a building.

Figure 2:
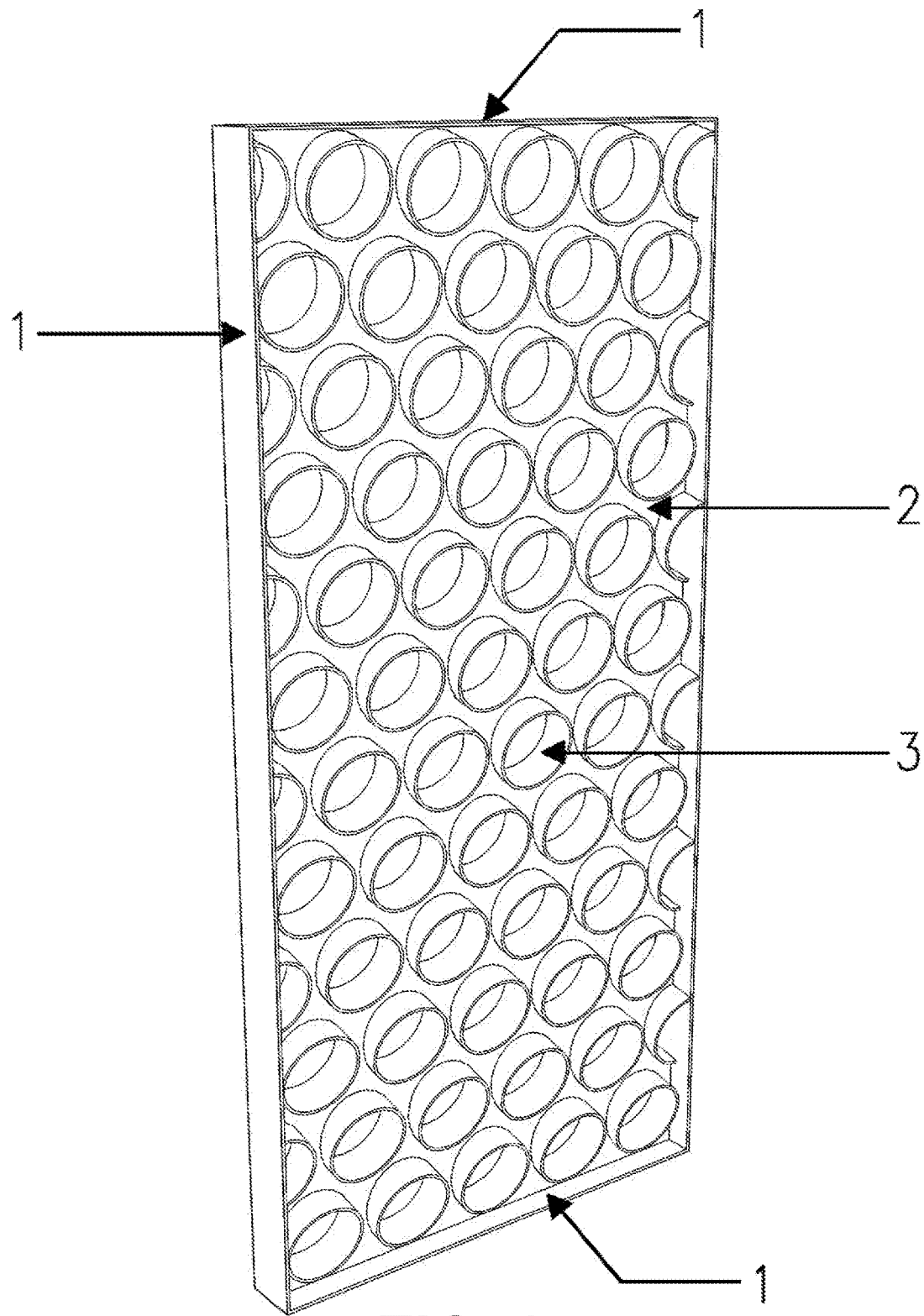
FIG. 2 shows a rear view of the solar shading panel.

FIG. 2 shows a rear view of the solar shading panel, which is used for the south side for the northern hemisphere and for the north side for the southern hemisphere. The solar panel for north and south sides consists of a frame (1) and an opaque panel (2) having the plurality of spacing perforates attached to the plurality of hollow cylinders (3) in order to obtain natural light and allow building users to perceive an external view of the building. The upper part of each of the cylinders (3) is for protecting against direct light partially or throughout the year and the lower part of each of the cylinders (3) is for receiving and reflecting natural light into a building.

Figure 3:
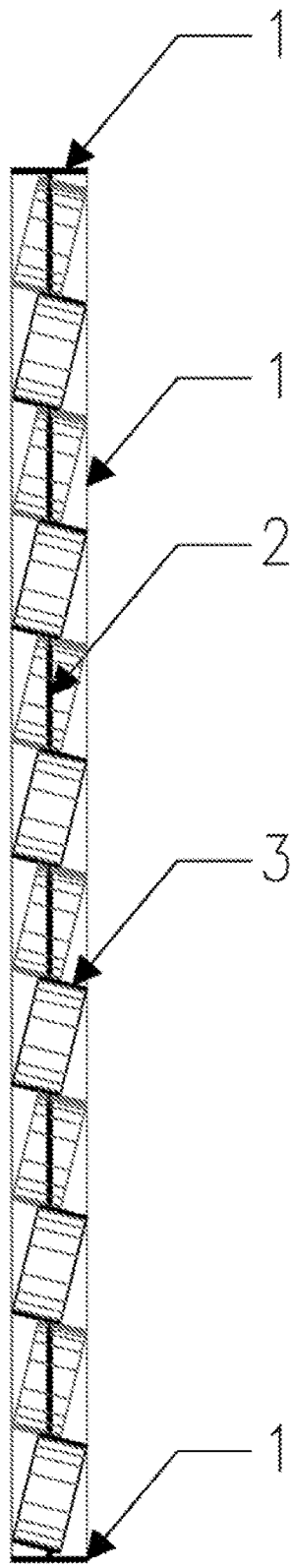
FIG. 3 shows a cross-sectional view of the solar shading panel.

FIG. 3 shows a cross-sectional view of the frame (1), the opaque panel (2), and a middle of the hollow cylinder (3), which has a tilt angle sloping downwards towards the rear of the panel.

Figure 4:
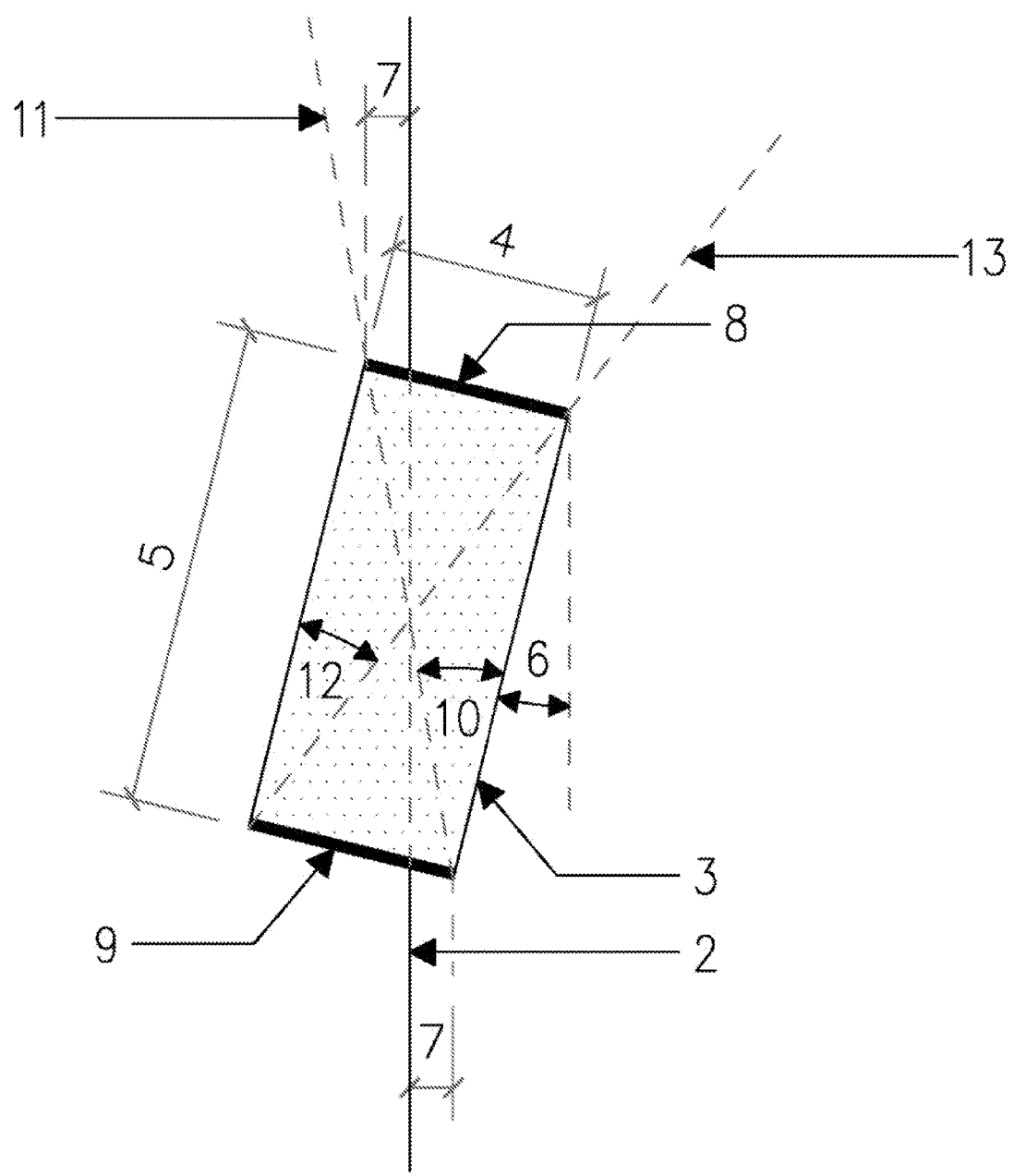
FIG. 4 shows a cross-sectional detail of the solar shading panel.

FIG. 4 shows a cross-sectional detail of the solar shading panel. The hollow cylinders (3) are attached to the opaque panel (2), which is perforated periodically. A perforated area is equal to a section plane area of the cylinder (3). The proportion of the extended part (4) or the depth of the cylinder is between 0.3-0.6 of the diameter (5) of the cylinder (3). A tilt angle of the cylinder's section plane and the vertical plane (6) is equal to the latitude of the installation location ±10 degrees (between −5 to 31 degrees for Thailand). The most effective tilt angle is equal to the latitude of the installation location. The distance between the opaque panel and the upper and lower rims of the cylinder (3) can be set equally. The opaque panel (2) may be placed parallel to the vertical plane or the section plane of the cylinder (3), or between the vertical plane and the section plane of the cylinder (3).

The upper part of the cylinder (8) helps to prevent against direct sunlight and the bottom of the cylinder (9) receives and reflects light into an internal space or an interior of a building. The very top of the cylinder (8) and the ramp-up is effective in preventing against direct light from the north side for the northern hemisphere and for the south side for the southern hemisphere (10). The bottom of the cylinder (8) on the slope down is effective in preventing direct light from the south (11) for the northern hemisphere and for the north for the southern hemisphere to get through the cylinder (3) partially or throughout the year.

The invention claimed is:

1. A solar shading panel for north and south sides configured for installation in a building, comprising:
   a frame; and
   an opaque panel having a plurality of spacing perforates, the opaque panel being attached to a plurality of hollow cylinders configured to provide natural light and an external view when installed, wherein an upper portion of each of the plurality of hollow cylinders is configured to protect against direct light partially or throughout the year, and a lower portion of each of the plurality of hollow cylinders is configured to receive and reflect natural light into the building.

2. The solar shading panel for north and south sides of claim 1, wherein each of the plurality of hollow cylinders has an extended portion or a depth having a proportion between 0.3-0.6 of its diameter.

3. The solar shading panel for north and south sides of claim 1, wherein each of the plurality of hollow cylinders is tilted and has a tilt angle sloping downwards towards a back of the solar shading panel.

4. The solar shading panel for north and south sides of claim 3, wherein the tilt angle of a section plane and a vertical plane of each of the plurality of hollow cylinders is equal to a latitude of an installation location ±10 degrees.

5. The solar shading panel for north and south sides of claim 4, wherein the opaque panel has a perforated area equal to a section plane area of each of the plurality of hollow cylinders with an extended proportion or the tilt angle, wherein an opaque panel plane of the opaque panel is configured for placement:
   (a) parallel to the vertical plane;
   (b) parallel to the section plane; or
   (c) in between the vertical plane and the section plane.

6. The solar shading panel for north and south sides of claim 4, wherein the tilt angle of the section plane and the vertical plane of each of the plurality of hollow cylinders is equal to the latitude of the installation location ±−5-31 degrees.

7. The solar shading panel for north and south sides of claim 1, wherein the solar shading panel is installed in the building.

8. The solar shading panel for north and south sides of claim 1, wherein the solar shading panel does not include electronic equipment configured to adjust an angle of the solar shading panel.

9. The solar shading panel for north and south sides of claim 1, wherein the solar shading panel is installed in the building in a north wall, a south wall, an opening, a doors, or a window.

10. A solar shading panel configured for installation in a building that protects against direct sunlight while providing natural light and an external view, comprising:

a frame configured for a fixed installation in the building;
an opaque panel having a plurality of perforated areas; and
a plurality of hollow cylinders positioned in the plurality of perforated areas of the opaque panel, each of the plurality of hollow cylinders having a tilt angle sloped downwards towards a rear of the solar shading panel, wherein:
   an upper portion of each of the plurality of hollow cylinders is configured to protect against direct light; and
   a lower portion of each of the plurality of hollow cylinders is configured to receive and reflect natural light into the building.

* * * * *